US009696745B2

(12) United States Patent
Romanov

(10) Patent No.: US 9,696,745 B2
(45) Date of Patent: Jul. 4, 2017

(54) APPARATUS FOR PRODUCING CONSTANT DIRECT LOAD CURRENT

(71) Applicant: CLOSED-UP JOINT-STOCK COMPANY DRIVE, Novosibirsk (RU)

(72) Inventor: Yuriy I. Romanov, Novosibirsk (RU)

( * ) Notice: Subject to any disclaimer, the term of this patent is extended or adjusted under 35 U.S.C. 154(b) by 0 days.

(21) Appl. No.: 14/420,657

(22) PCT Filed: Sep. 10, 2013

(86) PCT No.: PCT/RU2013/000785
§ 371 (c)(1),
(2) Date: Feb. 9, 2015

(87) PCT Pub. No.: WO2014/025291
PCT Pub. Date: Feb. 13, 2014

(65) Prior Publication Data
US 2015/0198963 A1 Jul. 16, 2015

(30) Foreign Application Priority Data
Aug. 7, 2012 (RU) .................. 2012133772

(51) Int. Cl.
*H02M 3/158* (2006.01)
*G05F 3/16* (2006.01)
*H02M 3/156* (2006.01)

(52) U.S. Cl.
CPC .............. *G05F 3/16* (2013.01); *H02M 3/156* (2013.01); *H02M 3/1588* (2013.01); *Y02B 70/1466* (2013.01)

(58) Field of Classification Search
CPC ........ G05F 3/16; H02M 3/156; H02M 3/1588

USPC .................................................. 323/222, 282
See application file for complete search history.

(56) References Cited

U.S. PATENT DOCUMENTS

| 5,949,223 A * | 9/1999 | Mine ..................... H02M 3/158 323/224 |
| 6,326,774 B1 * | 12/2001 | Mueller .............. H02M 3/1588 323/222 |
| 8,085,005 B2 * | 12/2011 | Dearn ................. H02M 3/1582 323/222 |
| 8,797,010 B2 * | 8/2014 | Dowlatabadi ........... H02M 1/36 323/284 |
| 2003/0052654 A1 * | 3/2003 | Kanakubo ........... H02M 3/1582 323/222 |

(Continued)

*Primary Examiner* — Gary L Laxton
*Assistant Examiner* — Kyle J Moody
(74) *Attorney, Agent, or Firm* — Patentagar PLLC; Alexander Rabinovich

(57) ABSTRACT

An apparatus for producing constant direct load current comprises a DC voltage source (DCVS), a DC-to-pulse voltage converter (DCPVC), a pulse-to-DC voltage converter (PDCVC), a DC stabilizer (DCS) and a control circuit (CC). The DCPVC is connected to the DCVC by its inputs and to the PDCVC by its outputs. A PDCVC output is connected to a DCPVC first control input and to a DCS first input, whose second input is connected to a DCVS positive output and whose first output is an apparatus output. A CC first input is connected to the PDCVC output, a CC second input is connected to a DCS second output, a CC first output is connected to a DCVS negative output, and a CC second output is connected to a DCPVC second control input. The result is stabilization of dissipation power in the stabilizer.

1 Claim, 2 Drawing Sheets

(56) References Cited

U.S. PATENT DOCUMENTS

| | | | | |
|---|---|---|---|---|
| 2006/0022648 A1* | 2/2006 | Ben-Yaakov | ....... | H02M 1/4225 |
| | | | | 323/222 |
| 2007/0236187 A1* | 10/2007 | Wai | ......................... | H02J 3/383 |
| | | | | 323/222 |
| 2011/0074356 A1* | 3/2011 | Yamazaki | ............. | H02J 7/0052 |
| | | | | 320/134 |

* cited by examiner

APPARATUS FOR PRODUCING CONSTANT DIRECT LOAD CURRENT

CROSS-REFERENCE TO RELATED APPLICATIONS

This application is a U.S. National phase application of International application PCT/RU2013/000785 filed on Sep. 10, 2013, which claims priority from Russian application 2012133772 filed on Aug. 7, 2012, the International and Russian applications being hereby incorporated by reference in their entirety.

BACKGROUND OF THE INVENTION

1. Field of the Invention

The present invention relates to electrical engineering and can be used in power supply of higher efficiency.

2. Description of the Related Art

Known in the art is a LED light source (RU 93611U1, published on Apr. 27, 2010) which comprises the following features: AC/DC voltage converter; capacitor filter connected with its terminals to outputs of the AC/DC voltage converter; DC/DC down voltage converter connected by its inputs to the capacitor filter terminals; a DC stabilizer including a voltage stabilizer and a resistor connected by one of its terminals to a voltage stabilizer output; and a load which is connected by one of load terminals to another terminal of the resistor and by another load terminal—to a negative terminal of the AC/DC voltage converter.

Common features of the present invention and the prior art are: a DC voltage supply, a DC stabilizer, and a load connected by one of load terminals to the output of the DC stabilizer and by another load terminal—to a negative output of the DC voltage supply.

Also known in the prior art is a LED light source (RU 99593U1, published on Nov. 20, 2010) which is selected as the closest analog (the prototype) and which comprises the following features: a rectifying diode bridge, a current stabilizer including a voltage stabilizer connected by one of its terminal (an input one) to a positive output of the rectifying diode bridge and a resistor connected by one of its terminals to an output of the voltage stabilizer and by its another terminal to a respective input (a control one) of the voltage stabilizer, and a load connected by one of its terminals to a current stabilizer output and by its another terminal to a negative terminal of the rectifying diode bridge.

Common features of the present invention and the prototype are: a DC voltage supply, a DC stabilizer, and a load connected by one of load terminals to the output of the DC stabilizer and by another load terminal—to a negative output of the DC voltage supply.

The technical result, which either of the above prior art fails to achieve, is stabilizing voltage drop at the DC stabilizer that results in lower dissipation power in the DC stabilizer when load impedance varies.

The failure to achieve the above technical result is due to lack of attention to the problem of stabilizing voltage drop at the DC stabilizer that lowers the dissipation power in the DC stabilizer at obtaining constant direct current in the circuit of power supply of variable load and results in higher efficiency.

SUMMARY OF THE INVENTION

With the features and analysis of the prior art in view, it is believed that the object of proposing an apparatus for generating constant direct load current unaffected by load variations that provides for voltage drop stabilization at the DC stabilizer and, thus, for lowering load-variation-independent heating power dissipation at the DC stabilizer, whereby higher efficiency can be achieved, as well as the technological capabilities aimed at providing a load constant direct current unaffected by load variations can be increased, is relevant to this day.

The above-identified technical result is achieved by means of providing an apparatus for generating constant direct load current comprising a DC voltage source, a DC stabilizer, and a load connected by one of its terminals to a DC stabilizer first output and by another of its terminals to a negative DC voltage source terminal and also provided with a DC-to-pulse voltage converter connected by its inputs to DC voltage source outputs, a pulse-to-DC voltage converter connected by its inputs to DC-to-pulse voltage converter outputs and by its output—to a first control input of the DC-to-pulse voltage converter and to a first input of the DC stabilizer, and a control circuit (CC) connected by its first input to the pulse-to-DC voltage converter output, by its second input—to a second DC stabilizer output, by its first output—to the negative DC voltage source terminal, and by its second output—to a second control input of the DC-to-pulse voltage converter.

Providing the DC-to-pulse voltage converter, pulse-to-DC voltage converter, and the CC connected as identified above makes it possible to convert constant voltage into pulse one and obtain the pulse voltage having a certain pulse duration that enters the pulse-to-DC voltage converter. After the conversion and filtration, a constant voltage appears at the converter outputs that is applied to the DC stabilizer first input and then, as a steady DC goes to the load. As this takes place, the voltage of a reference voltage source (18 in FIG. 1) fed through a resistor (17) from the positive terminal of the DC voltage source (1) is compared with the voltage at the source of the MOP-transistor (15) of the DC stabilizer (14), and a control voltage is formed at an output of an operational amplifier (OA) (16) to be applied to the gate of the MOP-transistor (15), whereby a balance is secured between the voltage at the connection of the MOP-transistor (15) and a resistor (19) and the voltage at the non-inverting input ("+") of the OA (16) which results in load constant direct current unaffected by load variations (caused, for example, by temperature changes when it is heated up. This also provides for stabilizing voltage at the MOP-transistor (15) drain-source due to comparing the voltage applied from the DC stabilizer (14) MOP-transistor (15) drain to an inverting input ("−") of a OA (22) of the CC (21) with the voltage applied to a CC (21) OA (22) non-inverting input ("+") from a reference voltage source (23) (being fed through a resistor 24 from a positive terminal of the DC voltage source (1)) whose second terminal is connected to a DC stabilizer (14) second output (the MOP-transistor (15) source).

Secured in this case is a voltage balance at the CC (21) OA (22) inverting ("−") and non-inverting ("+") inputs due to applying an amplified difference to the gate of the CC (21) MOP-transistor (25), which provides, via its drain, for the connection of the negative terminal of the DC voltage source (1) to the DC-to-pulse voltage converter (2) second control input and, through a resistor (9), to a OA (7) inverting input ("−"). By virtue of comparing the voltage applied at a particular moment to a DC-to-pulse voltage converter (2) OA (7) inverting input ("−") with the voltage sent out from the reference voltage source (5) and applied to the DC-to-pulse voltage converter (2) OA (7) non-inverting ("+") input, formed at the DC-to-pulse voltage converter (2) OA (7) output is the difference of the voltages, which acts upon a control input of a controllable gate circuit (6), changes the relative duration of pulses coming to the DC-to-pulse voltage converter (2) MOP-transistor (4) gate and provides for applying pulse voltage with the changed relative duration of pulses from the DC-to-pulse voltage converter (2) MOP-transistor (4) drain to the input of the converter 10 of pulse voltage into DC voltage. There, the pulse voltage, after the subsequent conversion and filtration thereof, appears at the pulse-to-DC voltage converter (10) output as the required changed voltage which, at all values of load (20), secures voltage at the DC stabilizer (14) MOP-transistor (15) drain-source equal to the CC (21) OA (22) non-inverting ("+") input voltage applied from the reference voltage source (23), whereby voltage stabilization at the MOP-transistor (15) drain-source and stabilization of the load current to make it load-variation-unaffected is secured.

In this way, the dissipation power at the MOP-transistor (15) becomes likewise stabilized and essentially load-change unaffected which results ultimately in substantial enhancing efficiency in which achieving the above-identified technical result manifests itself.

Analysis conducted on the proposed apparatus for providing load constant direct current failed to find prior art comprising both the whole feature aggregation and new features of the apparatus making it possible to come to the conclusion of the compliance of the proposed apparatus for providing load constant direct current with the "novelty" and "inventive step" criteria.

BRIEF DESCRIPTION OF DRAWINGS

These and other objects and features of the invention will be better understood from the ensuing description when considered together with accompanying drawings of FIG. 1, where a circuit schematic of the proposed apparatus is presented, and FIG. 2 where a functional block diagram thereof is shown.

DETAILED DESCRIPTION

Figure 1:
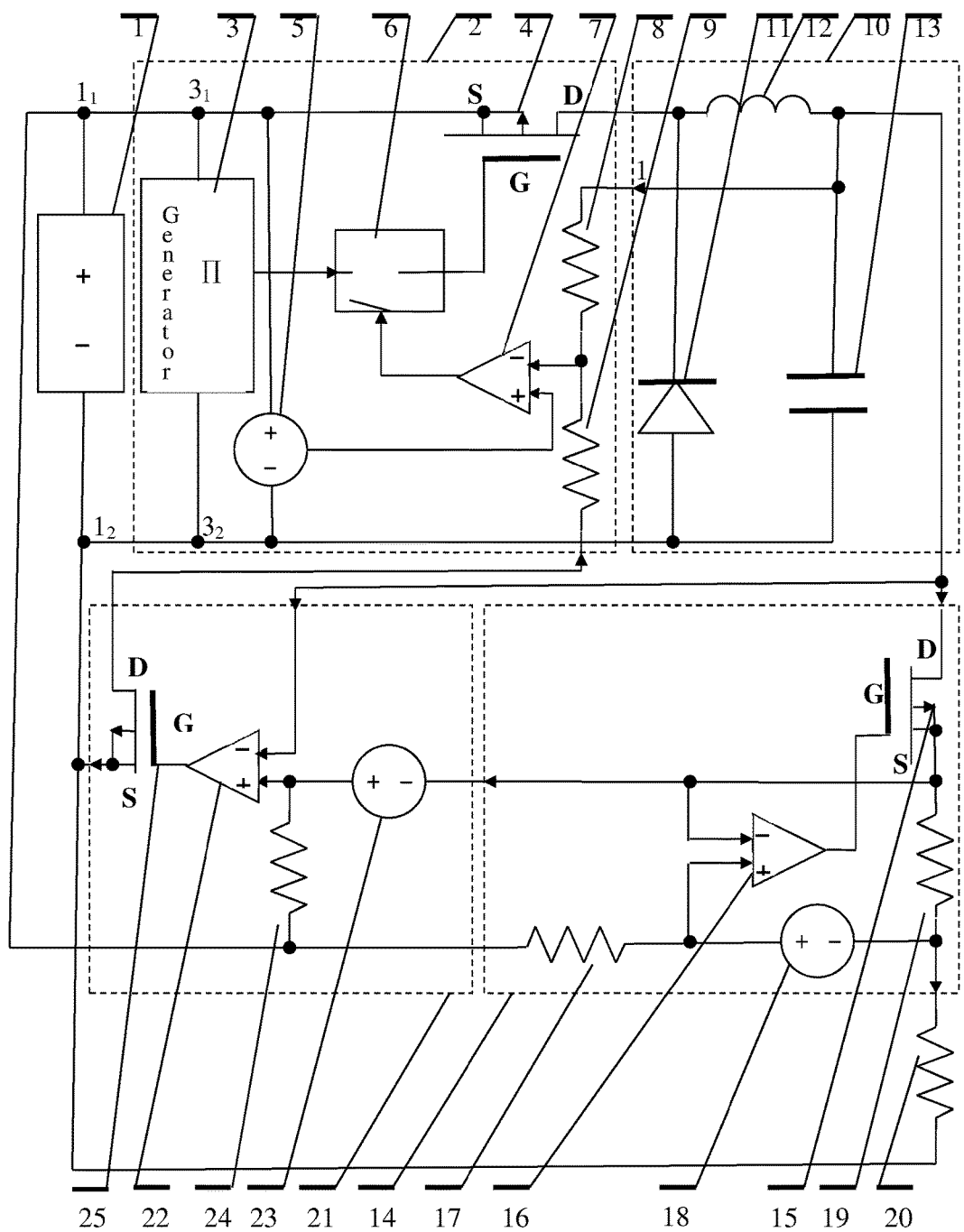
Figure 2:
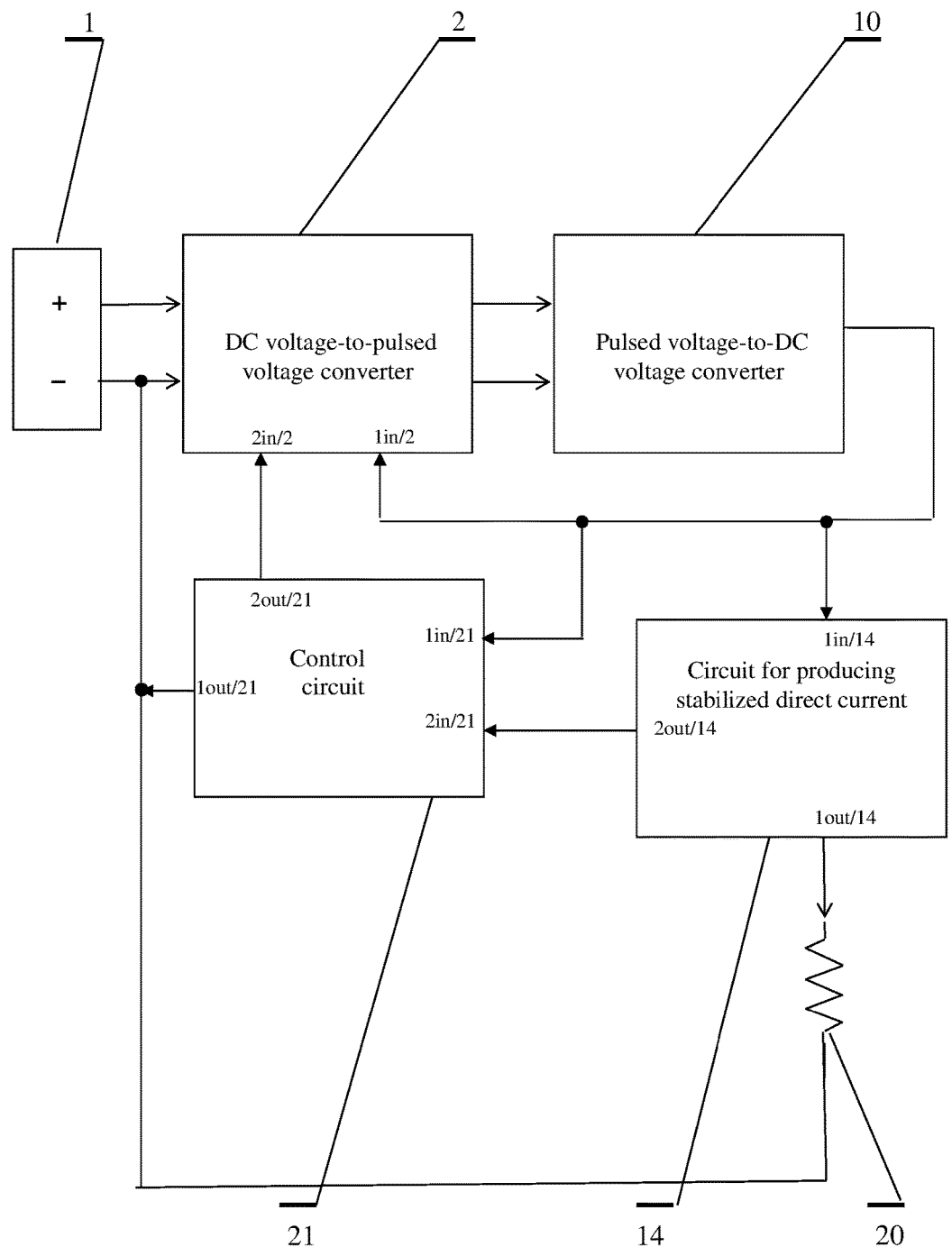

As follows from FIGS. 1 and 2, the present apparatus for providing constant direct load current comprises:
  a DC voltage source 1 that may include, for example, a full wave rectifier with a filter;
  a DC-to-pulse voltage converter 2 comprising: a constant frequency square pulse generator 3 connected by its terminals (which are the DC-to-pulse voltage converter 2 first and second inputs) in parallel to the DC voltage source 1 first and second terminals; a MOP-transistor 4 connected by its source to the DC voltage source 1 first terminal; a reference voltage source 5 connected by its inputs in parallel to the constant frequency square pulse generator 3 terminals; controllable gate circuit 6 connected by its (information) input to an output of the constant frequency square pulse generator 3 and by its output—to the MOP-transistor 4 gate; OA 7 connected by its output to a control input of the controllable gate circuit 6 and by its non-inverting ("+") input—to a reference voltage source 5 output; a first resistor 8, whose first terminal is connected to a OA 7 inverting ("−") input and a second terminal is connected to a DC-to-pulse voltage converter 2 first control input; a second resistor 9 connected by one of its terminals to the OA 7 inverting ("−") input, another terminal of the second resistor 9 being a DC-to-pulse voltage converter 2 second control input;
  a pulse-to-DC voltage converter 10 comprising a diode 11, a terminal of the cathode of which is a first pulse-to-DC voltage converter 10 input and is connected to the first output of the DC-to-pulse voltage converter 2 and a terminal of anode of which is a second pulse-to-DC voltage converter 10 input and is connected to the second output of the DC-to-pulse voltage converter 2; an inductor 12 connected by one of its terminals to the first output of the DC-to-pulse voltage converter 2; and a capacitor 13 connected by one of its plates to another inductor 12 terminal and to the DC-to-pulse voltage converter 2 first control input (which is the second terminal of the first resistor 8) and by another of its plates—to the DC voltage source 1 second terminal, the inductor 12 and capacitor 13 connecting point being a pulse-to-DC voltage converter 10 output;
  a DC stabilizer 14, which is a circuit for producing a stabilized direct current, the circuit comprising a MOP-transistor 15 connected by its drain, which is a DC stabilizer 14 first input, to the pulse-to-DC voltage converter 10 output; an OA 16 connected by its inverting ("−") input to a MOP-transistor 15 source, which is a DC stabilizer 14 second output, and connected by its output to a MOP-transistor 15 gate; and a reference voltage source 18 which is fed through a resistor 17 from the positive terminal of the DC voltage source 1, is connected by one of its terminals to a non-inverting ("+") input of the OA 16, and is connected by its another terminal to one of the terminals of a resistor 19 whose another terminal is connected to the source of the MOP-transistor 15, the point of connection of the reference voltage source 18 and resistor 19 being a DC stabilizer 14 first output;
  a load 20 connected by its one (first) terminal to the DC stabilizer 14 first output and connected by its another (second) terminal to the negative (second) terminal of the DC voltage source 1; and
  a CC 21 comprising an OA 22 directly connected by its inverting ("−") input, which is also a CC 21 first input, to the pulse-to-DC voltage converter 10 output, and connected by its non-inverting ("+") input to a (first terminal of a) CC 21 reference voltage source 23, whose second terminal is a CC 21 second input connected to the DC stabilizer 14 second output; a resistor 24 connected by one of its terminals to the OA 22 non-inverting ("+") input and connected by its another terminal to the positive (first) terminal of the DC voltage source 1; and MOP-transistor 25 connected by its gate to a OA 22 output, connected by its source to the negative (second) terminal of the DC voltage source 1, and connected by its drain, which is also the CC 21 second output, to the DC-to-pulse voltage converter 2 second control input which is the other terminal of the DC-to-pulse voltage converter 2 second resistor 9.

In operation of the proposed apparatus for producing load constant direct current, when DC voltage from the DC voltage source 1 terminals is applied to the DC-to-pulse voltage converter 2 inputs, the constant frequency square pulse generator 3 of the converter 2 starts generating pulses coming to the controllable gate 6 information input. Since the voltage at the OA 7 inverting ("−") input is less than that at the OA 7 non-inverting ("+") input, its output will be at the voltage which will keep the controllable gate circuit 6 open, to thereby make passing the constant frequency square pulse generator 3 pulses through the controllable gate circuit 6 to the MOP-transistor 4 gate possible. The MOP-transistor 4 converts DC voltage from the DC voltage source 1 into pulse voltage, and these pulses come from the MOP-transistor 4 drain to the pulse-to-DC voltage converter 10 first input. After the respective conversion and filtration by a LC-filter (the inductor 12 and capacitor 13), DC voltage at the pulse-to-DC voltage converter 10 output starts increasing. Through the resistor 8, it is applied to the DC-to-pulse voltage converter 2 first control input, namely to the OA 7 inverting ("−") input, while applied to the non-inverting ("+") input of the OA 7 is voltage from the reference voltage source 5.

As long as the voltage at the OA 7 inverting ("−") input is less than that at the OA 7 non-inverting ("+") input, the voltage at the OA 7 output will keep the controllable gate circuit 6 open, and, accordingly, the constant frequency square pulse generator 3 pulses will come to the MOP-transistor 4 gate. There will be variable duration voltage pulses at the DC-to-pulse voltage converter 2 output, which pulses, after they are applied to, and are converted and filtrated in, the pulse-to-DC voltage converter 10, will give rise to the pulse-to-DC voltage converter 10 output voltage. The resultant increasing DC voltage at the pulse-to-DC voltage converter 10 output arrives at the DC stabilizer 14 first input (the MOP-transistor 15 drain) where, by means of a voltage stabilizer comprising the OA 16, MOP-transistor 15 and the reference voltage source 18, which is fed through the resistor 17 from the positive terminal of the DC voltage source 1, the voltage at the DC stabilizer 14 resistor 19 stabilizes. As a result of that, the current flowing through the resistor 19 will depend neither on the DC stabilizer 14 input voltage nor the load 20, the value of the current being defined by the resistance of the resistor 19 and the DC stabilizer 14 reference voltage source 18 voltage.

In this case, once the voltage of the reference source 18 connected to the DC stabilizer 14 OA 16 non-inverting ("+") input is higher than the voltage at the OA 16 inverting ("−") input connected to the DC stabilizer 14 MOP-transistor 15 source and resistor 19, then the voltage at the OA 16 output connected to the MOP-transistor 15 gate will be of such value that the MOP-transistor 15 opens, and the voltage at the resistor 19 will be increasing for as long as it becomes equal to the reference source 18 voltage. At this moment, the voltage at the OA 16 output and, respectively, at the MOP-transistor 15 source will stop increasing and will be of such a value that the voltage at the MOP-transistor 15 source and resistor 19 connecting point is equal to the voltage at the OA 16 non-inverting ("+") input, which is equal to the reference source 18 voltage. This state will remain affected by neither changes of the DC stabilizer 14 input voltage nor load 20 changes. Thus, despite the changes of load 20 values, a stabilized, constant, DC, whose value is defined by the reference source 18 output voltage and the resistor 19 value, will flow through the load 20.

As the DC stabilizer 14 input voltage increases, the DC stabilizer 14 MOP-transistor 15 source-drain voltage will increase, and ever-growing heat power will be generated at the transistor 15. To stabilize the heat power generated at the MOP-transistor 15 regardless of changes of the load 20 and changes of the DC stabilizer 14 input voltage, the MOP-transistor 15 source-drain voltage should be stabilized. To accomplish this, the voltage from the MOP-transistor 15 drain is applied to the CC 21 OA 22 inverting ("−") input, whereas applied to the CC 21 OA 22 non-inverting ("+") input is the voltage from one terminal of the reference voltage source 23 connected by its other terminal to the DC stabilizer 14 MOP-transistor 15 source, i.e. the voltage from the DC stabilizer 14 second output is applied. As this takes place, the reference voltage 23 is fed through the resistor 24 from the DC voltage source 1 positive terminal. The comparison of the voltages results in forming a voltage at the CC 21 OA 22 output, this voltage appearing at the CC 21 MOP-transistor 25 gate to secure connecting the DC voltage 1 negative terminal through the drain of this transistor to the DC-to-pulse voltage converter 2 second control input, i.e. through the second resistor 9 to the DC-to-pulse voltage converter 2 OA 7 inverting ("−") input. As long as the voltage at the CC 21 OA 22 inverting ("−") input is less than the voltage at the CC 21 OA 22 non-inverting ("+") input, the voltage at the OA 22 output connected to the CC 21 MOP-transistor 25 gate will be high enough to keep the CC 21 MOP-transistor 25 open and, accordingly, to keep the DC-to-pulse voltage converter 2 second resistor 9 connected through the CC 21 transistor 25 to the DC voltage 1 source negative terminal. In consequence of this, the voltage at the DC-to-pulse voltage converter 2 OA 7 inverting ("−") input will be less that the voltage at the non-inverting ("+") input of the DC-to-pulse voltage converter 2 OA 7, and the voltage at its output will be of such value as to keep the DC-to-pulse voltage converter 2 controllable gate circuit 6 open, to thereby make passing the DC-to-pulse voltage converter 2 constant frequency square pulse generator 3 pulses to the MOP-transistor 4 gate possible. Thus, present at the pulse-to-DC voltage converter 10 input will be pulses of varying relative pulse duration which, after the conversion and filtration at the pulse-to-DC voltage converter 10, will cause the output voltage of the converter to increase.

This process will last until the voltage at the drain of the DC stabilizer 14 MOP-transistor 15 relative to its source becomes equal to, or higher than, the CC 21 reference voltage source 23 voltage. As soon as it occurs, the voltage at the CC 21 OA 22 inverting ("−") input exceeds the voltage at the CC 21 OA 22 non-inverting ("+") input which will create voltage of such a value at the OA 22 output connected to the CC 21 transistor 25 gate that the transistor will start closing. As a result of that, the voltage at the DC-to-pulse voltage converter 2 OA 7 inverting ("−") input will increase and exceed the voltage at the DC-to-pulse voltage converter 2 OA 7 non-inverting ("+") input, and the output voltage of the DC-to-pulse voltage converter 2 OA 7 will be of such a value that the controllable gate circuit 6 will be closed, preventing the pulses from the constant frequency square pulse generator 3 from reaching the MOP-transistor 4 gate. Because of that, the pulse-to-DC voltage converter 10 output voltage will cease to increase and start decreasing to again make the voltage at the DC-to-pulse voltage converter 2 OA 7 inverting ("−") input less than that at the non-inverting ("+") input of the DC-to-pulse voltage converter 2 OA 7, and the whole process will be repeating itself.

In other words, the DC-to-pulse voltage converter 2 OA 7 compares those voltages and creates a control output voltage applied to the control input of controllable gate circuit 6 which opens or closes its contacts to thereby have the relative duration of pulses varied as they come to the gate of the MOP-transistor 4 converting the voltage of the DC voltage source 1 into the pulse voltage. Those pulses arrive from the drain of the MOP-transistor 4 to the input of the pulse-to-DC voltage converter 10, and, after the pulse voltage is converted and filtered by the LC-filter (the inductor 12 and capacitor 13), the output voltage of the converter 10 starts increasing again. It comes to the first control input of the DC-to-pulse voltage converter 2 through the first resistor 8 and further to the inverting ("−") input of the OA 7. Coming to its non-inverting ("+") input is the voltage from the reference voltage source 5. As long as the voltage at the inverting ("−") input of the OA 7 is less than the voltage at its non-inverting ("+") input, the OA 7 output voltage will be of such a value as to have the controllable gate circuit 6 open, and, accordingly, the pulses from the constant frequency square pulse generator 3 will arrive at the gate of the transistor 4, and present at the DC-to-pulse voltage converter 2 output will be pulses which, after the conversion and filtration in the pulse-to-DC voltage converter 10, will cause the output voltage of the converter 10 to increase. The resultant increasing DC voltage at the output of the pulse-to-DC voltage converter 10 comes to the first input of the DC stabilizer 14, namely to the drain of the MOP-transistor 15. By this means, the voltage at the drain-source of the of the DC stabilizer 14 MOP-transistor 15 will be equal to the value of the CC 21 reference voltage source 23 voltage with small voltage ripple, whereas the current in the load 20 will be unaffected by load variations, as will be the dissipation heat power at the DC stabilizer MOP-transistor 15 in particular and in the apparatus for producing the constant load direct current as a whole.

To confirm that the above technical result is achieved, the apparatus for producing constant direct load current was wired up at the functional level and tested, the test results thereof being summarized in the Table 1. The tests of the apparatus for producing constant direct current that were performed and the data presented in the below Table show that the dissipation heat power is governed mainly by the DC stabilizer 14 MOP-transistor 15 dissipation heat power which is unaffected by load variations, and, as a consequence, the efficiency of the proposed apparatus for producing constant direct load current will be substantially higher in comparison with the prior art.

TABLE 1

The results of the tests on the proposed apparatus for producing constant load direct current

| No seri-atim | $U_{inp}$, V | $I_{inp}$, mA | $P_{inp}$, mWt | $U_{outp}$, V | $I_{outp}$, mA | $P_{outp}$, mWt | Eff, % | $P_{dissip}$, mWt |
|---|---|---|---|---|---|---|---|---|
| 1  | 38    | 45   | 1710  | 0.41  | 1034 | 423.9   | 24.79 | 1286.1 |
| 2  | 38    | 65   | 2470  | 1.02  | 1033 | 1053.7  | 42.66 | 1416.3 |
| 3  | 38.04 | 94   | 3576  | 2.01  | 1033 | 2076.3  | 58.07 | 1499.4 |
| 4  | 38.03 | 121  | 4602  | 3     | 1032 | 3096.0  | 67.28 | 1505.6 |
| 5  | 38.02 | 149  | 5665  | 4     | 1032 | 4128.0  | 72.87 | 1537.0 |
| 6  | 38.01 | 179  | 6804  | 5.08  | 1032 | 5242.6  | 77.05 | 1561.2 |
| 7  | 37.99 | 206  | 7826  | 6.07  | 1032 | 6759.6  | 80.61 | 1559.4 |
| 8  | 37.97 | 259  | 9834  | 8.02  | 1032 | 8276.6  | 84.16 | 1557.6 |
| 9  | 38.03 | 314  | 11941 | 10.01 | 1032 | 10330.3 | 86.51 | 1611.1 |
| 10 | 38    | 370  | 14060 | 12.04 | 1031 | 12413.2 | 88.29 | 1646.8 |

TABLE 1-continued

The results of the tests on the proposed apparatus for producing constant load direct current

| No seri-atim | $U_{inp}$, V | $I_{inp}$, mA | $P_{inp}$, mWt | $U_{outp}$, V | $I_{outp}$, mA | $P_{outp}$, mWt | Eff, % | $P_{dissip}$, mWt |
|---|---|---|---|---|---|---|---|---|
| 11 | 38.02 | 423  | 16082 | 14    | 1031 | 14434.0 | 89.75  | 1648.5 |
| 12 | 38.02 | 479  | 18212 | 16.07 | 1032 | 16584.2 | 91.06  | 1627.3 |
| 13 | 38.01 | 534  | 20297 | 18.06 | 1031 | 18619.9 | 91.74  | 1677.5 |
| 14 | 38    | 587  | 22306 | 20.06 | 1031 | 20681.9 | 92.72  | 1624.1 |
| 15 | 38.01 | 641  | 24364 | 22.07 | 1032 | 22776.2 | 93.48  | 1588.2 |
| 16 | 38.02 | 694  | 26386 | 24.05 | 1032 | 24819.6 | 94.06  | 1566.3 |
| 17 | 38    | 748  | 28424 | 26.06 | 1032 | 26893.9 | 94.62  | 1530.1 |
| 18 | 38.02 | 800  | 30416 | 28.05 | 1032 | 28947.6 | 95.17  | 1468.4 |
| 19 | 38    | 853  | 32414 | 30.02 | 1031 | 30950.6 | 95.49  | 1463.4 |
| 20 | 38.05 | 904  | 34397 | 32.02 | 1031 | 33012.6 | 95.97  | 1384.6 |
| 21 | 38.03 | 957  | 36395 | 33.99 | 1030 | 35009.7 | 96.19  | 1385.0 |
| 22 | 38.02 | 984  | 37412 | 35.05 | 1031 | 36136.6 | 96.59  | 1275.1 |
| 23 | 38.02 | 997  | 37906 | 35.58 | 1031 | 36683.0 | 96.77% | 1223.0 |
| 24 | 38.02 | 1001 | 38058 | 35.84 | 1029 | 36879.4 | 96.90% | 1178.7 |

What is claimed is:

1. An apparatus for producing a constant direct load current, comprising:
   a DC voltage source;
   a DC stabilizer adapted to produce direct current unvarying upon load changing;
   a DC-to-pulse voltage converter;
   a pulse-to-DC voltage converter; and
   a control circuit;
   the DC-to-pulse voltage converter being connected by inputs thereof to outputs of the DC voltage source;
   the pulse-to-DC voltage converter being connected by inputs thereof to outputs of the DC-to-pulse voltage converter;
   the pulse-to-DC voltage converter being directly connected by an output thereof to:
      a first control input of the DC-to-pulse voltage converter,
      a first input of the control circuit, and
      a first input of the DC stabilizer;
   the control circuit being connected:
      by a second input thereof to a second output of the DC stabilizer;
      by a first output thereof directly to a negative terminal of the DC voltage source; and
      by a second output thereof to a second control input of the DC-to-pulse voltage converter; and
   a first output of the DC stabilizer being an output of the apparatus,
   whereby the constant direct load current unaffected by load variations is generated and heating power dissipation is lowered, with higher efficiency resulted.

* * * * *